(12) United States Patent
Odd et al.

(10) Patent No.: US 12,105,209 B2
(45) Date of Patent: Oct. 1, 2024

(54) METHOD AND APPARATUS FOR AUTOMATIC DETECTION OF ANTENNA SITE CONDITIONS

(71) Applicant: ADVA Optical Networking SE, Meiningen OT Dreissigacker (DE)

(72) Inventors: Sandbekkhaug Odd, Allen, TX (US); Erik Oostveen, Coventry (GB); Ralph Gerst, Munich (DE); Nir Laufer, Zoran (IL); Joseph Phelan, Suwanee, GA (US)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 1138 days.

(21) Appl. No.: 16/358,097

(22) Filed: Mar. 19, 2019

(65) Prior Publication Data
US 2020/0301021 A1 Sep. 24, 2020

(51) Int. Cl.
*G01S 19/23* (2010.01)
*G01S 19/21* (2010.01)
(Continued)

(52) U.S. Cl.
CPC ............ *G01S 19/21* (2013.01); *G06N 3/08* (2013.01); *G06V 10/454* (2022.01);
(Continued)

(58) Field of Classification Search
CPC ...... G06N 3/08; G06N 3/0445; G06N 3/0454; G01S 19/215; G01S 19/23; G01S 19/36; G01S 19/21; G01S 19/35; H04K 2203/32; H04K 3/22; G06V 10/454; G06V 10/82; G06K 9/6272
See application file for complete search history.

(56) References Cited

U.S. PATENT DOCUMENTS

| | | | | |
|---|---|---|---|---|
| 6,070,051 A | * | 5/2000 | Astrom | H04B 7/18519 455/12.1 |
| 7,860,344 B1 | * | 12/2010 | Fitzpatrick | G06T 5/50 348/222.1 |

(Continued)

FOREIGN PATENT DOCUMENTS

| | | |
|---|---|---|
| CN | 107229058 A | 10/2017 |
| CN | 109458980 A | 3/2019 |

(Continued)

OTHER PUBLICATIONS

Communication of the extended European search report for European Patent Application Serial No. 20151758.8 (Sep. 15, 2020).

*Primary Examiner* — Timothy A Brainard
*Assistant Examiner* — Ismaaeel A. Siddiquee
(74) *Attorney, Agent, or Firm* — Jenkins, Taylor & Hunt, P.A.

(57) ABSTRACT

A method for automatic detection of antenna site conditions, ASC, at an antenna site, AS, of an antenna, A, the method comprising the steps of providing (S1) signal source observations, SSO, derived from signals received by the antenna, A, from at least one signal source, SS, and transforming (S2) the signal source observations, SSO, into images fed to a trained image-processing artificial intelligence, AI, model which calculates antenna site conditions, ASC, at an antenna site, AS, of the respective antenna, A.

30 Claims, 11 Drawing Sheets

(51) Int. Cl.
  G06N 3/08     (2023.01)
  G06V 10/44    (2022.01)
  G06V 10/764   (2022.01)
  G06V 10/82    (2022.01)
  G01S 19/35        (2010.01)
  G01S 19/36        (2010.01)
  G06N 3/044        (2023.01)
  G06N 3/045        (2023.01)
  H04K 3/00         (2006.01)

(52) U.S. Cl.
  CPC ............ G06V 10/764 (2022.01); G06V 10/82 (2022.01); *G01S 19/215* (2013.01); *G01S 19/23* (2013.01); *G01S 19/35* (2013.01); *G01S 19/36* (2013.01); *G06N 3/044* (2023.01); *G06N 3/045* (2023.01); *H04K 3/22* (2013.01); *H04K 2203/32* (2013.01)

(56) References Cited

U.S. PATENT DOCUMENTS

| | | | |
|---|---|---|---|
| 10,024,975 | B2 | 7/2018 | Dougan |
| 10,605,890 | B1* | 3/2020 | Yun ........................ H04W 16/18 |
| 10,664,722 | B1* | 5/2020 | Sharma ............... G06F 18/2431 |
| 2017/0059715 | A1 | 3/2017 | Wietfeldt et al. |
| 2017/0350985 | A1* | 12/2017 | Agee ..................... G01S 19/215 |
| 2018/0100920 | A1 | 4/2018 | Thomas, Jr. |
| 2018/0329070 | A1* | 11/2018 | Dougan ................. G01S 19/03 |
| 2019/0072659 | A1 | 3/2019 | Gu et al. |
| 2020/0225358 | A1* | 7/2020 | Kaabouch ............. G06N 3/048 |

FOREIGN PATENT DOCUMENTS

| | | | | |
|---|---|---|---|---|
| EP | 3 683 541 A1 | | 7/2020 | |
| JP | H06314060 A | * | 11/1994 | ............... G01S 5/14 |
| WO | WO 2019/040964 A1 | | 3/2019 | |

* cited by examiner n pixels m pixels

METHOD AND APPARATUS FOR AUTOMATIC DETECTION OF ANTENNA SITE CONDITIONS

TECHNICAL FIELD

The invention relates to a method and apparatus for automatic detection of antenna site conditions at an antenna site of an antenna, in particular a satellite antenna.

TECHNICAL BACKGROUND

A reception antenna such as a satellite antenna receives signals from a signal source. A signal source can comprise a satellite transmitting a high-frequency signal to a reception antenna located at an antenna site. GNSS (Global Navigation Satellite System) satellites are used for many purposes, including geographical positioning and derivation of highly accurate timing signals emitted by an atomic clock onboard the satellite for use in applications such as telecommunications and enterprise networking. A satellite-based system requires visibility to several high-quality satellite signals at any given time to perform its operation. When installing an antenna, in particular a satellite signal reception antenna, serving applications with a high level of timing and location accuracy, it is essential to ensure that the antenna has the best possible view of the sky and can therefore pick up the maximum number of satellites for use with minimal multipath reflections from surrounding objects. It is difficult to provide an optimal antenna placement at the antenna site because signal sources such as satellites can be movable and may transmit their signals from different locations. For example, satellites move around in the sky and may dip in and out of view of the satellite signal reception antenna. Further, obstructions between the antenna and the movable signal source such as the satellite signal source will result in a weak signal strength or no reception signal at all. Furthermore, once the antenna has been placed at the antenna site, the environment around the antenna site may change. For example, a growing tree or a constructed building may result in a partial or full obstruction of the environment of the antenna site which can deteriorate the signal received by the respective antenna. In addition, the antenna itself or the connecting cables can be damaged due to environmental influences such as lightning leading to a degraded signal reception by the antenna.

The use of a conventional test equipment can yield limited information about the overall antenna installation combined with manual inspection, making the installation and maintenance of antennas an error-prone task. Because networks may comprise several hundred antennas installed in different locations, manual inspection of the antenna sites is impractical and network operators are forced to use a reactive approach for responding to degraded antenna signal receptions as they happen. Accordingly, there is a need for a method and apparatus for automatic detection of antenna site conditions at an antenna site of an antenna.

SUMMARY OF THE INVENTION

The invention provides according to a first aspect a method for automatic detection of antenna site conditions at an antenna site of an antenna,
the method comprising the steps of:
providing signal source observations derived from signals received by the antenna from at least one signal source and transforming the signal source observations into images fed to a trained image-processing artificial intelligence model which calculates antenna site conditions at an antenna site of the respective antenna.

In a possible embodiment of the method according to the first aspect of the present invention, the artificial intelligence model is implemented as a neural network, in particular as a convolutional neural network.

In a further possible embodiment of the method according to the first aspect of the present invention, the signal source comprises a satellite signal source transmitting satellite signals received by the antenna to derive satellite signal source observations of the antenna with respect to the satellite signal source.

In a further possible embodiment of the method according to the first aspect of the present invention, each satellite signal source observation comprises
an azimuth angle of the satellite signal source in relation to the antenna,
an elevation angle of the satellite signal source in relation to the antenna and
a signal strength of the satellite signal received by the antenna from the satellite signal source.

In a further possible embodiment of the method according to the first aspect of the present invention, the satellite signal source observations are transformed into a two-dimensional grey-scale image fed to the trained image-processing artificial intelligence model, wherein the pixels of said grey-scale image have pixel intensities based on the signal strength of the received satellite signals.

In a further possible embodiment of the method according to the first aspect of the present invention, the azimuth angle of the satellite signal source in relation to the antenna and the elevation angle of the satellite signal source in relation to the antenna form three-dimensional horizontal coordinates of the satellite signal source which are transformed into corresponding two-dimensional Cartesian coordinates of the satellite signal source.

In a further possible embodiment of the method according to the first aspect of the present invention, the two-dimensional Cartesian coordinates are transformed into a two-dimensional array of image pixels having pixel intensity values computed from the signal strength of the signal received from the satellite signal source at the respective coordinates and normalized to provide the two-dimensional grey-scale image fed to the trained image-processing artificial intelligence model.

In a further possible embodiment of the method according to the first aspect of the present invention, the trained artificial intelligence model calculates an obstruction vector comprising a predetermined number of probability values each indicating a probability that an obstruction of the antenna exists in an associated antenna sector around the antenna site of the respective antenna.

In a further possible embodiment of the method according to the first aspect of the present invention, the obstruction vectors calculated for the antenna site of the respective antenna are timestamped and stored in an obstruction vector database.

In a further possible embodiment of the method according to the first aspect of the present invention, the calculated obstruction vectors of an antenna are processed to detect changes in the obstruction vectors reflecting changes of the antenna site conditions at the antenna site of the respective antenna.

In a still further possible embodiment of the method according to the first aspect of the present invention, a registered sequence of obstruction vectors calculated for an antenna are fed to a further artificial intelligence model implemented as a neural network, in particular as a recurrent neural network, to detect changes of the antenna site conditions at the antenna site of the respective antenna.

In a still further possible embodiment of the method according to the first aspect of the present invention, an alert is automatically generated if changes in the antenna site conditions at the antenna site of the respective antenna are detected.

In a further possible embodiment of the method according to the first aspect of the present invention, the image-processing artificial intelligence model is trained on the basis of a plurality of two-dimensional grey-scale images divided into a predetermined number of labeled image sectors around the antenna site of the antenna.

In a still further possible embodiment of the method according to the first aspect of the present invention, an expected satellite signal source trajectory is calculated for each satellite signal source observed at the antenna site of the antenna.

In a still further possible embodiment of the method according to the first aspect of the present invention, the satellite signal source trajectory is calculated from a starting configuration comprising a start time, a satellite identifier identifying the respective satellite signal source and a geo-location of the observed antenna site of the respective antenna.

In a still further possible embodiment of the method according to the first aspect of the present invention, the calculated expected satellite signal source trajectory comprises a set of expected satellite positions at different time steps relative to an observer antenna site of the antenna including an azimuth angle and an elevation angle relative to the observer antenna site at each time step.

In a further possible embodiment of the method according to the first aspect of the present invention, the calculated set of expected satellite positions with associated time steps are supplied to a recurrent neural network as training data used to train the recurrent neural network to recognize a satellite signal source trajectory described by the training data, wherein the trained recurrent neural network is stored in a memory.

In a further possible embodiment of the method according to the first aspect of the present invention, satellite signal source observations of the antenna are fed to the trained recurrent neural network to verify whether the satellite signal source observations do match with an expected satellite signal source trajectory modelled by the trained recurrent neural network.

In a further possible embodiment of the method according to the first aspect of the present invention, if the satellite signal source observations do not match the expected satellite signal source trajectory, an alarm is triggered indicating a possible spoofing of the satellite signal source location.

In a further possible embodiment of the method according to the first aspect of the present invention, a training set of obstruction vectors labeled as normal or jammed are supplied to an artificial intelligence model implemented as a deep neural network with hidden layers as training data used to train said artificial intelligence model to recognize a normal reception versus a jammed reception, wherein the trained artificial intelligence model is stored as a jamming model in a memory.

In a further possible embodiment of the method according to the first aspect of the present invention, satellite signal source observations are transformed into a two-dimensional grey-scale image fed to a trained convolutional neural network to calculate an obstruction vector supplied to the trained artificial intelligence jamming model calculating as an output whether the signal reception is normal or jammed.

The invention further provides according to a second aspect an antenna site condition detection apparatus for automatic detection of antenna site conditions at an antenna site of at least one antenna, wherein said apparatus comprises a processor adapted to process signal source observations derived from a signal received by the antenna from a signal source to transform the signal source observations into images fed to a trained image-processing artificial intelligence model which calculates antenna site conditions at the antenna site of the respective antenna.

In a possible embodiment of the apparatus according to the second aspect of the present invention, the signal source observations comprise satellite signal source observations including an azimuth angle of the satellite signal source in relation to the antenna, an elevation angle of the satellite signal source in relation to the antenna and a signal strength of the satellite signal received by the antenna from the satellite signal source.

In a further possible embodiment of the antenna site condition detection apparatus according to the second aspect of the present invention, the processor is adapted to transform the satellite signal source observations into a two-dimensional grey-scale image fed to the trained image-processing artificial intelligence model, wherein the pixels of said grey-scale image have pixel intensity values based on the signal strength of the received satellite signals.

In a further possible embodiment of the antenna site condition detection apparatus according to the second aspect of the present invention, the processor is adapted to transform the azimuth angle of the satellite signal source relative to the antenna and the elevation angle of the satellite signal source relative to the antenna forming three-dimensional horizontal coordinates of the satellite signal source into corresponding two-dimensional Cartesian coordinates of the satellite signal source.

In a further possible embodiment of the antenna site condition detection apparatus according to the second aspect of the present invention, the processor is further adapted to transform the two-dimensional Cartesian coordinates into a two-dimensional array of image pixels having pixel intensity values computed from the signal strength of the received satellite signal source at the respective coordinates and normalized to provide the two-dimensional grey-scale image fed to the trained image-processing artificial intelligence model.

In a further possible embodiment of the antenna site condition detection apparatus according to the second aspect of the present invention, the trained artificial intelligence model is adapted to calculate an obstruction vector comprising a predetermined number of probability values each indicating a probability that an obstruction of the antenna exists at an associated antenna sector around the antenna site of the respective antenna, wherein the calculated obstruction vectors of the antenna site of the respective antenna are timestamped and stored in an obstruction vector database.

In a further possible embodiment of the antenna site condition detection apparatus according to the second aspect of the present invention, the calculated obstruction vectors of an antenna are processed by the processor to detect changes in the obstruction vectors reflecting changes of the antenna site conditions at the antenna site of the respective antenna, wherein a registered sequence of obstruction vectors calculated for an antenna are fed into a further artificial intelligence model implemented as a neural network, implemented in particular as a recurrent neural network to detect changes of the antenna site conditions at the antenna site of the respective antenna.

In a further possible embodiment of the antenna site condition detection apparatus according to the second aspect of the present invention, the image-processing artificial intelligence model implemented in particular by a convolutional neural network is trained on the basis of a plurality of two-dimensional grey-scale images divided into a predetermined number of labeled image sectors around the antenna site of the antenna.

In a further possible embodiment of the antenna site condition detection apparatus according to the second aspect of the present invention, the apparatus is adapted to automatically generate an alert if changes in the antenna site conditions at the antenna site of the respective antenna are detected.

In a further possible embodiment of the antenna site condition detection apparatus according to the second aspect of the present invention, the satellite signal source observations are supplied to a trained recurrent neural network of said apparatus to verify whether the satellite signal source observations match with an expected satellite signal source trajectory.

In a further possible embodiment of the antenna site condition detection apparatus according to the second aspect of the present invention, the satellite signal source observations are transformed into a two-dimensional grey-scale image fed to a trained convolutional neural network of said apparatus to calculate an obstruction vector supplied to a trained artificial intelligence jamming model calculating as an output whether the signal reception is normal or jammed.

DETAILED DESCRIPTION OF EMBODIMENTS

Figure 1:
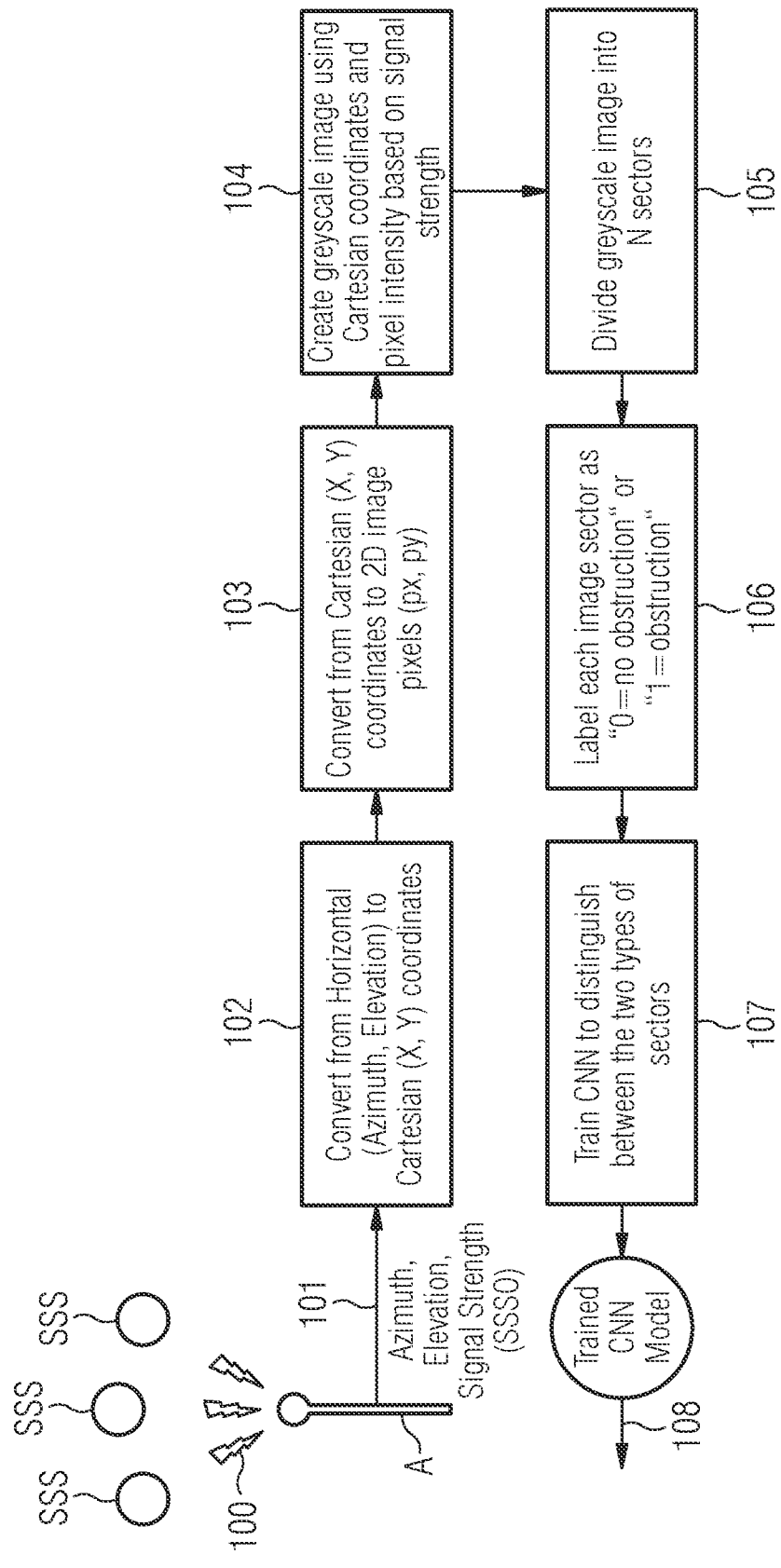
FIG. 1 shows a schematic diagram for illustrating a possible exemplary embodiment of a method and corresponding apparatus for automatic detection of antenna site conditions according to the present invention.

The invention provides according to a first aspect a method for automatic detection of antenna site conditions ASC at an antenna site AS of an antenna A, in particular a satellite antenna. The antenna A illustrated schematically in FIG. 1 is adapted to receive continu ously (101) signals from one or more signal sources. Signal sources can comprise satellite signal sources such as GNSS (Global Navigation Satellite System) satellites. Signal source observations SSO are derived from the signals received by the antenna A. The signal source observations SSO are transformed into images fed to a trained image-processing artificial intelligence model which calculates antenna site conditions ASC at an antenna site AS of the respective antenna A. The artificial intelligence model, AIM, can be implemented as a neural network, in particular as a convolutional neural network CNN.

Figure 3:
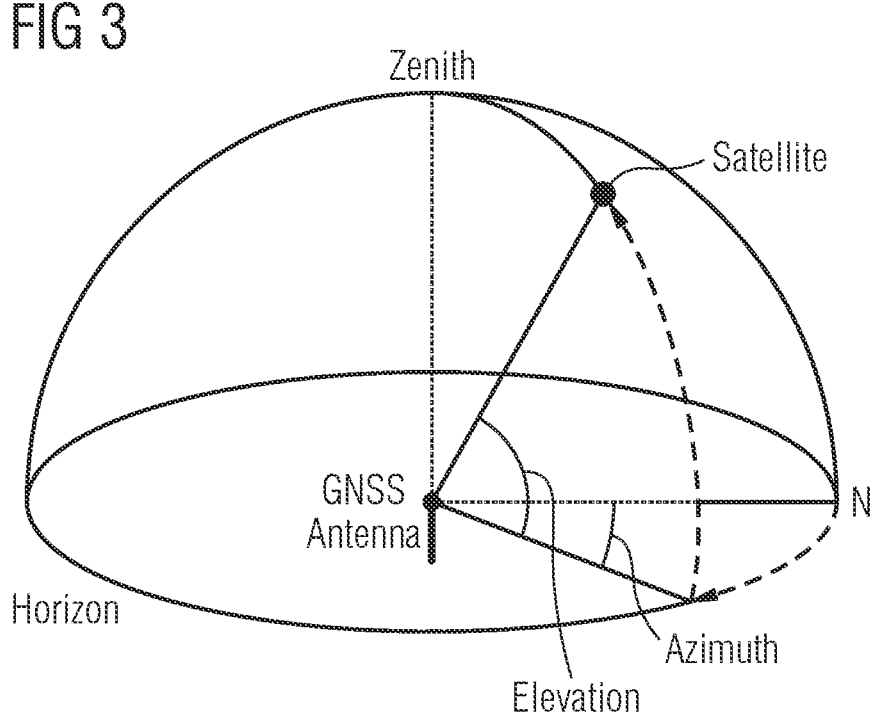
FIG. 3 illustrates satellite signal source observations which can be made by a satellite antenna in a possible embodiment of the method and corresponding apparatus for automatic detection of antenna site conditions according to the present invention.

FIG. 1 shows the training phase for training the convolutional neural network model. In the illustrated embodiment of FIG. 1, the antenna A can comprise a GNSS antenna connected to a host system. The signal sources transmitting the signals to the receiving antenna A comprise satellite signal sources SSS transmitting satellite signals received by the antenna A to derive automatically satellite signal source observations SSSO of the antenna A with respect to the satellite signal sources SSS. Each satellite signal source observation SSSO comprises an azimuth angle of said satellite signal source SSS in relation to the antenna A, an elevation angle of the satellite signal source SSO in relation to the antenna A and a signal strength of the satellite signal received by the antenna A from the respective satellite signal source SSS. The antenna A is adapted to supply in step 101 the satellite signal source observations (SSSO) to the host system. The host system can comprise a computation platform and at least one processor capable of reading the antenna outputs and forwarding these values to a user interface on demand. Further, the host system can store in a possible embodiment a lo cal history of the satellite signal source observations SSSO made by the antenna A in a memory for later retrieval and processing. An azimuth and elevation angle identify as a parameter pair the relative location of each satellite signal source SSS from the standpoint of the observer, i.e. the antenna A, in a horizontal coordinate system as illustrated in FIG. 3. The azimuth angle of the satellite signal source SSS in relation to the antenna A and the elevation angle of the satellite signal source SSS in relation to the antenna A form three-dimensional, 3D, horizontal coordinates of the satellite signal source SSS which are transformed in step 102 into corresponding two-dimensional, 2D, Cartesian coordinates of the respective satellite signal source SSS. The two-dimensional, 2D, Cartesian coordinates are then converted in step 103 into a two-dimensional array of image pixels having pixel intensity values computed from the signal strength of the signal received from the satellite signal source SSS at the respective coordinates and normalized to provide a two-dimensional, 2D, grey-scale image. In this embodiment, GNSS antenna data is transformed from horizontal coordinates as shown in FIG. 3 to normalized Cartesian coordinates thereby projecting (flattening) the three-dimensional, 3D, horizontal coordinates onto a two-dimensional space. The GNSS antenna position is exactly in the center of the respective coordinate system. After the initial flattening transformation, the Cartesian coordinates (x, y) are further transformed in step 103 into a two-dimensional array representing computer pixels. The position of the antenna A is preserved to be in the exact middle of the respective image. In step 104, a pixel value of each coordinate is computed from the signal strength at the coordinate and can be normalized into a range of [0 . . . 1], thereby producing a single-channel grey-scale image. A low signal strength value can be represented as a value close to 1.0, and a high signal strength value can be represented as a value close to 0. In this embodiment, a pixel value of zero means that there is no satellite signal source observation SSSO for that part of the image. In this manner, the image comprises pixels with intensity values in the range of [0 . . . 1], wherever there are satellite signal source observations SSSO and the remaining image pixels (with no or missing observations) can be colored empty with a value reflecting high signal strength. This arrangement allows to identify deviations from high signal strength, i.e. low signal strength areas. In other words, the value of "missing" is chosen not to be close to "low signal strength" since a situation "no satellite" is different from a situation "satellite with a very low signal strength". A value mapping is a matter of preference and can be different in different embodiments. The "missing" value of 1.0 and scaling the signal strength from low=0.0 to high=1.0 thus work equally well. The salient point is that the "low" signal strength value must not be confused with a "no/missing" data point.

Figure 5:
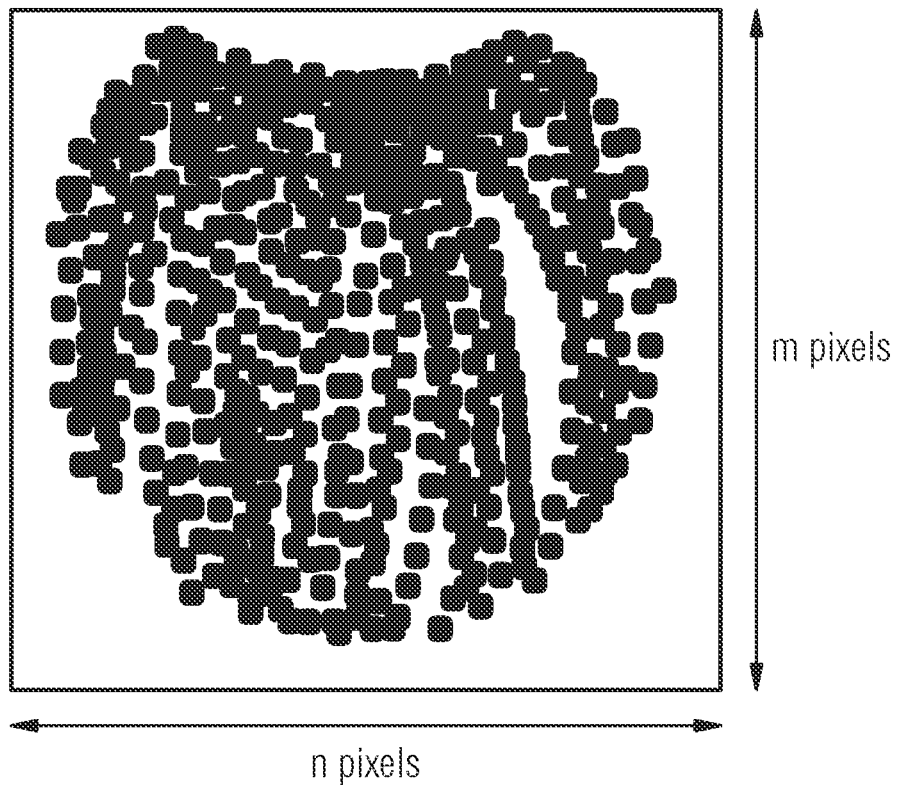
FIG. 5 shows an example of a grey-scale image used in a possible embodiment of the method and corresponding apparatus for automatic detection of antenna site conditions according to the present invention.

The created two-dimensional, 2D, grey-scale image created in step 104 is illustrated as an example in FIG. 5. The created grey-scale image shows each individual satellite signal source observation SSSO as a point in space wherein the pixel intensity increases with reduced signal strength. This does allow to visually identify areas of low signal strength in the grey-scale image by looking for high-intensity pixel values. The grey-scale image can be used as input to a neural network algorithm because they form a fixed-size (n×m) input array regardless of the number of satellite signal sources SSS observed by the antenna A. Accordingly, the method and apparatus according to the present invention can operate with any combination of GNSS constellations such as GPS, GLONASS, BEIDOU or GALILEO and can be easily ingested by a conventional neural network input layer of a neural network.

To provide for an automatic detection of antenna obstructions in the spectrogram, a convolutional neural network CNN can be trained to recognize clusters of low signal strength areas in the two-dimensional, 2D, greyscale image having been created in step 104. The choice of convolutional neural networks CNN over other neural network types is beneficial because of the way how convolutional networks CNN do process image features. Image features are learned in a position/scale, rotation-independent manner and the convolutional neural network CNN can therefore be effectively trained on a relatively small data set.

Figure 6:
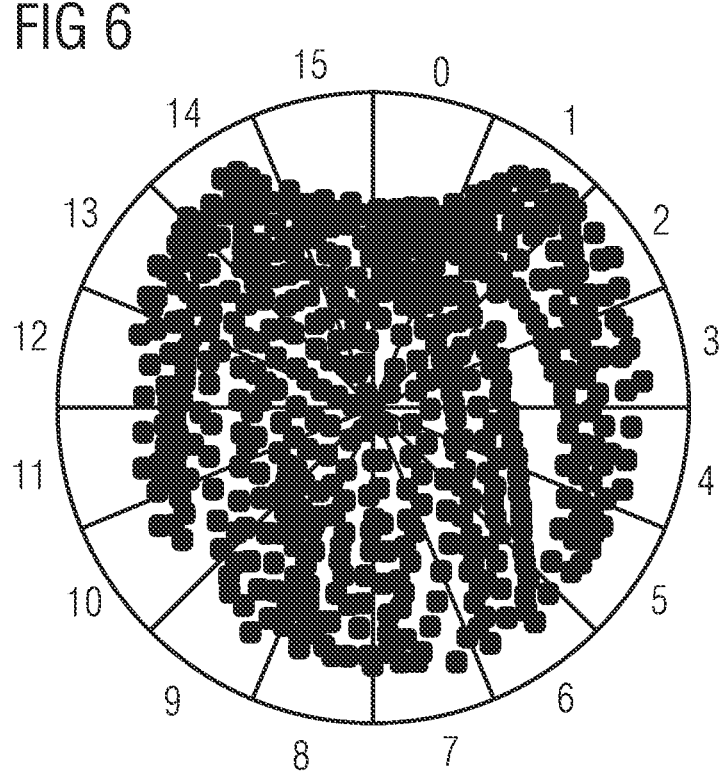
FIG. 6 illustrates the grey-scale image of FIG. 5 with a grey-scale image divided into equal-sized sectors.

In the illustrated training process of FIG. 1, each spectrogram can be divided up into N equal-sized sectors around a 360-degree circle in step 105, wherein the antenna origin is in the middle of the image as also illustrated in FIG. 6. The number N of equal-sized sectors can vary depending on the use case. The number of N=16 provides good accuracy but can be adapted according to the individual situation. Each sector forms a pie-wedge enclosing a number of pixels which can be analyzed to determine whether the respective sector should be labeled as "contains obstruction" or "does not contain obstruction". The labeling of the data can be done in a possible embodiment manually. In an alternative preferred embodiment, the labeling is performed automatically by an algorithm based on a predetermined labeling rule. Accordingly, in the training process illustrated in FIG. 1, each image sector of the divided grey-scale image is labeled in step 106 to provide a training data set. Each grey-scale image receives N labels, i.e. one label for each sector, to provide a multi-label convolutional neural network CNN. The training data can be structured as tuples of (GNSS image, labels) and can be used to train a two-dimensional convolutional neural network CNN illustrated as step 107 in the schematic diagram of FIG. 1. This results into a trained convolutional network model which can be stored in step 108 in a memory.

With enough supplied training data, the GNSS convolutional network CNN learns to highlight sectors with clusters of low signal strength satellite observations using conventional neural network training methods. The resulting GNSS convolutional neural network model provided by the framing process illustrated in FIG. 1 can then be used to process data from new antenna sites and predict sectors with obstructions based on just the observed satellite positions and signal strengths.

Figure 2:
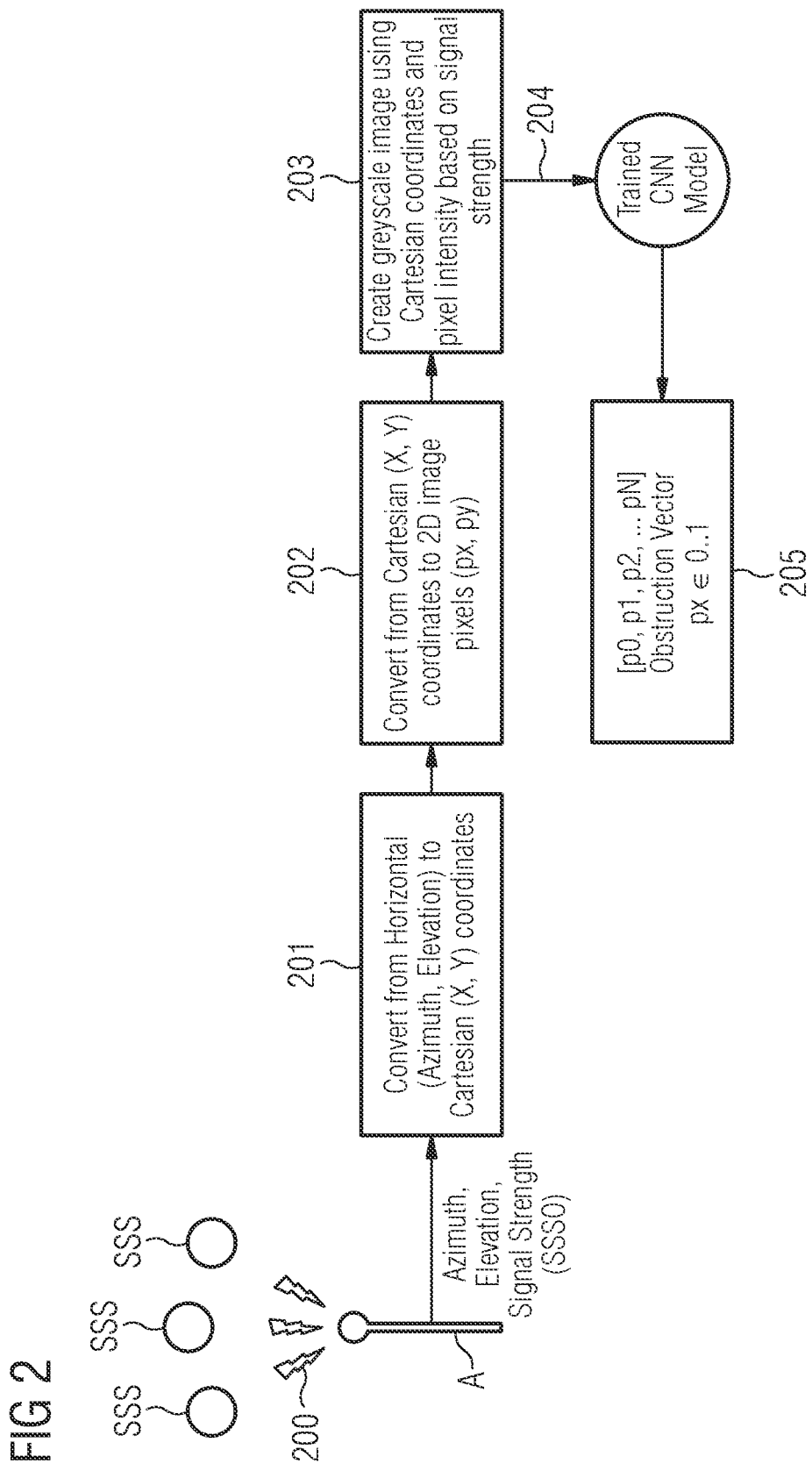
FIG. 2 shows a further schematic diagram for illustrating a further possible exemplary embodiment of a method and corresponding apparatus for automatic detection of antenna site conditions according to the present invention.

FIG. 2 shows schematically the use of the trained convolutional neural network model in the inference phase. The satellite signal source observations SSSO derived from the received (200) satellite signals are transformed in a two-dimensional, 2D, grey-scale image fed to the trained image-processing artificial intelligence model. The azimuth angle of the satellite signal source SSS in relation to the antenna A and the elevation angle of the satellite signal source SSS in relation to the antenna AO form three-dimensional, 3D, horizontal coordinates of the satellite signal source SSS which are transformed in step 201 into corresponding two-dimensional, 2D, Cartesian coordinates (x, y) of the satellite signal source SSS. The two-dimensional, 2D, Cartesian coordinates are then transformed in step 202 into a two-dimensional array of image pixels having pixel intensity values computed from the signal strength of the signal received from the satellite signal source SSS at the respective coordinates and normalized in step 203 to provide a two-dimensional, 2D, grey-scale image fed in step 204 to the trained image-processing artificial intelligence model which is formed in a possible embodiment by a trained convolutional neutral network model. Accordingly, observations of visible satellite signal sources SSS are collected for a given satellite antenna, in particular a GNSS antenna A, as shown in FIG. 2. These satellite signal observations SSO are transformed into a GNSS image which is then fed as input in step 204 to the artificial intelligence model prediction function which can be provided by the trained convolutional neural network CNN resulting from the training process illustrated in FIG. 1. The trained artificial intelligence model AIM calculates in a possible embodiment an obstruction vector V in step 205 comprising a predetermined number of probability values p as shown in FIG. 2. Each probability value p indicates a probability that an obstruction of the antenna A exists in an associated antenna sector around the antenna site AS of the respective antenna A. The artificial intelligence model prediction function provided by the trained convolutional neural network, CNN, model returns the obstruction vec tor V comprising a number N of probability values p each indicating a probability that an obstruction of the antenna A does exist in an associated antenna sector around the antenna site AS of the antenna A.

The obstruction vectors V calculated in step 205 for the antenna site AS of the respective antenna A can be timestamped and stored in a possible embodiment in an obstruction vector database. The calculated obstruction vectors V of the antenna A can be processed to detect changes in the obstruction vectors V reflecting changes of the antenna site conditions ASC at the antenna site AS of the respective antenna A. In a possible embodiment, the registered sequence of obstruction vectors V calculated for the antenna A can be fed to a further artificial intelligence, AI, model to detect changes of the antenna site conditions ASC at the antenna site AS of the antenna A. A further artificial intelligence, AI, model can be implemented in a possible embodiment by a recurrent neural network RNN. In a possible embodiment, an alert is automatically generated if changes in the antenna site conditions ASC at the antenna site AS of the antenna A are detected. In the method for automatic detection of antenna site conditions ASC at an antenna site AS of an antenna such as the antenna A as illustrated in FIG. 2, satellite observations are logged over time to create a grey-scale image with pixel values reflecting the signal strength of the received satellite signal in a two-dimensional image. In the detection method illustrated in FIG. 2, pixels are mapped with missing GNSS observations as "high signal strength" in order to clearly localize low signal strength observations. Effective neural network models typically prefer data inputs at fixed size. To comply with this, the GNSS data is automatically transformed into a fixed-size two-dimensional image supplied to the trained artificial neural network. Conventional sky view plots are not usable as training data as they do not typically encode signal strength. With the illustrated method, sectors of the grey-scale image are classified according to a level of signal obstruction within each sector of the two-dimensional image. Using a convolutional neural network CNN as opposed to any other neural network architecture has the advantage that image features are position and/or scale and/or rotation independent. This allows to use GNSS data from one geographical part of the world for training data and apply the resulting model in other parts of the world as the GNSS sky plot general shape does rotate according to latitude and longitude of the observer.

The artificial intelligence, AI, model, i.e. the trained convolutional neural network model illustrated in FIG. 2 can output an N-element obstruction vector V for a given antenna site AS based on the most recent satellite observations. The individual probabilities p of this obstruction vector V comprise stable values with only slight variations (such as due to weather) over time as long as the environment around the antenna A does not change. Changes in the environment of the antenna A can cause diminished signal reception quality. For example, if a new building is constructed or a neighboring tree does grow taller, the signal received by the antenna A can diminish in its quality. In a possible embodiment, a network operator is automatically alerted whenever antenna site conditions ASC at the antenna site AS of the antenna A do change.

Obstruction vectors V calculated for each antenna site AS reflect the environment around the respective antenna A. A further neural network model can be developed to detect changes in the obstruction vectors V.

Figure 4:
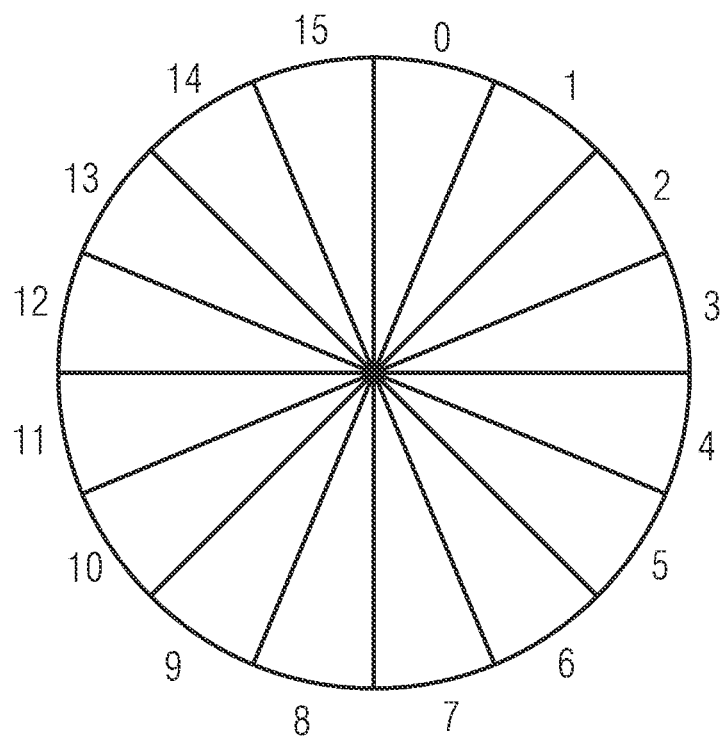
FIG. 4 illustrates antenna site sectors around an antenna used in a possible embodiment of the method and corresponding apparatus for automatic detection of antenna site conditions.
Figure 7:
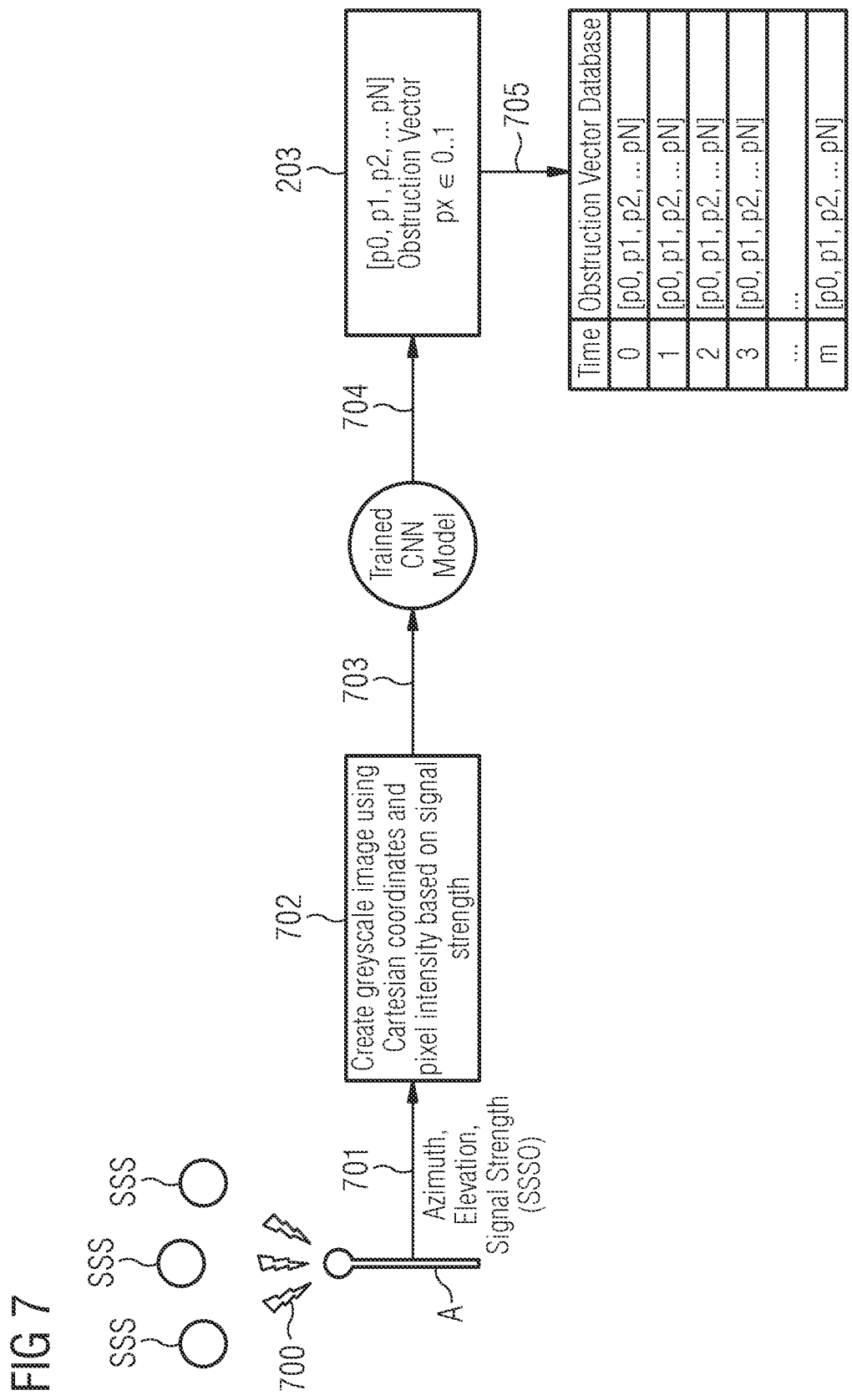
FIG. 7 shows a further schematic diagram for illustrating a further possible exemplary embodiment of a method and corresponding apparatus for automatic detection of antenna site conditions according to the present invention.
Figure 8:
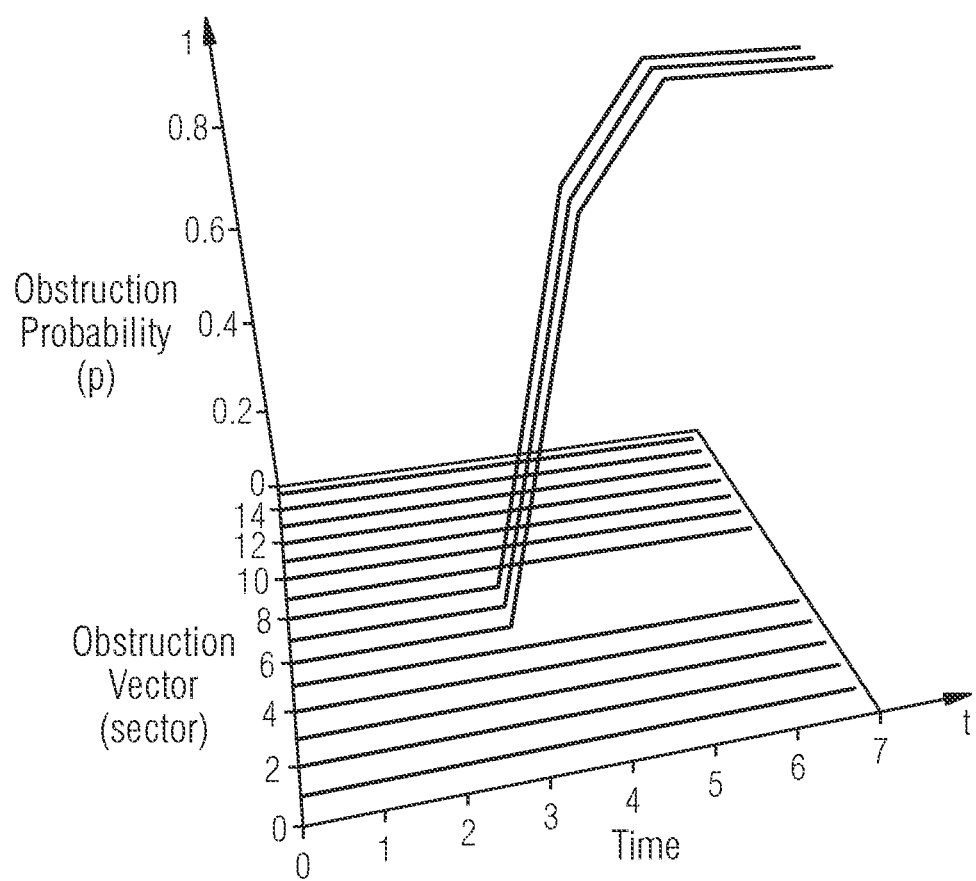
FIG. 8 illustrates an example of an obstruction vector history processed in a possible embodiment of a method and corresponding apparatus for automatic detection of antenna site conditions according to the present invention.

As can be seen in the schematic diagram of FIG. 7, an antenna A can provide supply in step 701 antenna data including satellite signal observations SSSO comprising an azimuth angle, an elevation angle and a signal strength derived from satellite signals received in step 700 to a host system. In a further step 702, a grey-scale image can be created using Cartesian coordinates and pixel intensities based on the signal strength. The generated grey-scale image is supplied in step 703 to a trained convolutional network model which can be the result of a training process as illustrated in FIG. 1. The trained convolutional network calculates in step 704 a sequence of obstruction vectors V as also explained in context with FIG. 2. Each obstruction vector V can be timestamped and stored in an obstruction vector database in step 705 as also illustrated in FIG. 7. In a possible embodiment, a GNSS artificial intelligence model can be run on a regular interval, for example daily, and the obstruction vector output from the trained GNSS artificial intelligence model is stored in the historical timestamped database in step 705. The stored obstruction vector history can be analyzed for significant changes in individual vector positions. For example, a signifi cant change in a value means that there is a corresponding significant change in the GNSS satellite reception conditions and may be correlated to a likely change in the environment of the antenna site AS. This is illus trated in FIG. 8. In the illustrated example, the obstruction vector V comprises N sectors each having an associated obstruction probability value p. In the illustrated example, the obstruction probabilities p of the recorded obstruction vectors V change over time. In the illustrated example of FIG. 8 at time $t_3$, the obstruction struction probability p increases significantly in sectors 6, 7, 8, i.e. in Southern direction of the antenna site AS as also visible from FIG. 4. The obstruction probability p increases from time $t_3$ to $t_4$ from 0 to more than 0.6 in the sectors 6, 7, 8. The obstruction probability p of the corresponding sectors does further in crease up to time $t_4$ to a value of more than 0.8 as shown in FIG. 8. The obstruction vector history is analyzed automatically to detect significant changes in individual vector positions, i.e. obstruction probabilities p in the obstruction vector V. A significant change in value such as for sectors 6, 7, 8 is an indication that there is a corresponding significant change in the satellite signal reception conditions which may be correlated to a change in the environment such as a growing tree or a building in construction.

The obstruction vector analysis of the obstruction vector V can be performed in different ways. In a possible embodiment, the obstruction vector analysis uses a snapshot compared to a previous obstruction vector V. In an alternative embodiment, the obstruction vector analysis uses a snapshot compared to a known baseline obstruction vector V. In a still further possible embodiment, the obstruction vector analysis is based on a trend over time. The history of obstruction vectors V can be fed to a neural network such as a time series model using a recurrent neural network RNN to model natural (seasonal) changes in the reception conditions and to detect deviations from these natural (seasonal) changes. In a possible embodiment, an alert can automatically be generated if changes in the antenna site conditions ASC at the antenna site AS of the antenna A are detected. These alerts can be supplied to a platform of a network operator.

In a possible embodiment, an expected satellite signal source trajectory SSST can be calculated for each satellite signal source SSS observed at the antenna site AS of the antenna A. The satellite signal source trajectory SSST can be calculated in a possible embodiment from a starting configuration comprising a start time, a satellite identifier identifying the respective satellite signal source SSS and a geolocation of the observed antenna site AS of the antenna A. The calculated expected satellite signal source trajectory SSST can comprise a set of expected satellite positions at different time steps relative to the observer antenna site AS of the antenna A including an azimuth angle and an elevation angle relative to the observer antenna site AS at each time step. In a possible embodiment, the calculated set of expected satellite positions with associated time steps can be supplied to a recurrent neural network RNN as training data used to train the recurrent neural network RNN to recognize a satellite signal source trajectory SSST described by the training data. The trained recurrent neural network RNN can be stored in a memory. The satellite signal source observations SSSO of the an tenna A can be fed to the trained recurrent neural net work RNN to verify whether the satellite signal source observations SSSO do match with an expected satellite signal source trajectory SSST modeled by the trained recurrent neural network RNN. In case that the satellite signal source observations SSSO do not match the ex pected satellite signal source trajectory SSST, an alarm can be triggered indicating a possible spoofing of the satellite signal source location.

Figure 9:
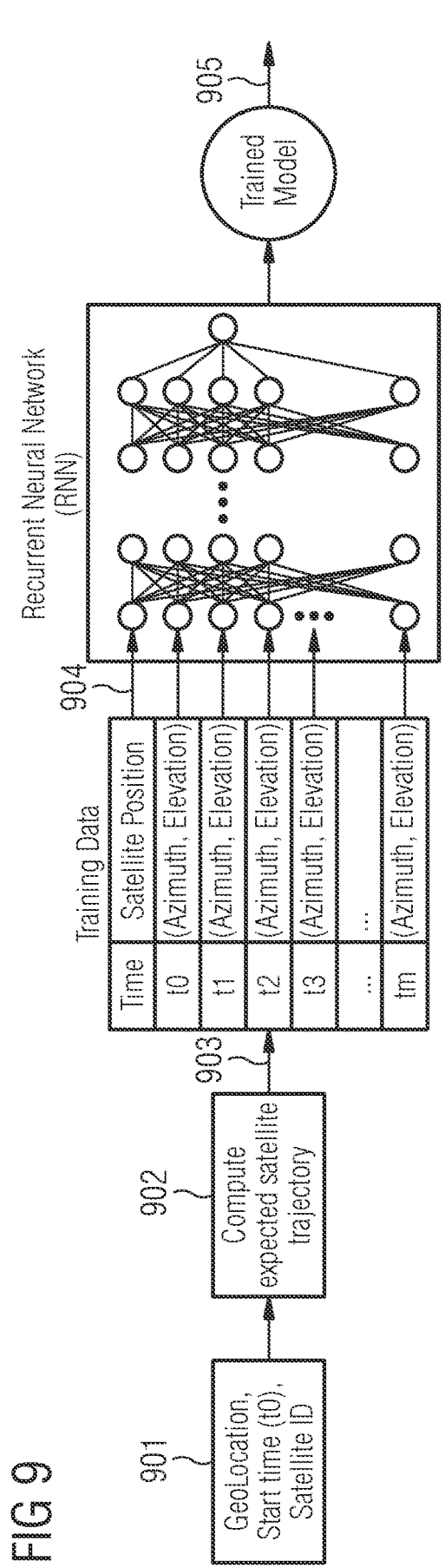
FIG. 9 shows a further schematic diagram for illustrating a further possible exemplary embodiment of a method and corresponding apparatus for automatic detection of antenna site conditions according to the present invention.

Accordingly, the present invention provides according to a further aspect a method for detecting spoofing of satellite signal source locations. In the illustrated schematic diagram of FIG. 9, an expected satellite signal source trajectory SSST can be computed in step 902 from a starting configuration provided in step 901. The starting configuration comprises in a possible embodiment a start time $t_0$, a satellite identifier identifying the respective satellite signal source SSS and a geolocation of the observed antenna site AS of the antenna A. The starting configuration provided in step 901 can consist of a geographical location of the observer, a precise start time and a satellite ID of the satellite. Based on this information, the satellite signal source trajectory SSST of the satellite as seen from the observer site can be precisely computed in step 902 for the starting time step $t_0$ and m time steps $t_0$ to $t_m$. The number of time steps can be chosen to be large enough to span a complete repeating trajectory. The computed positions can be stored in step 903 in a training data set as illustrated in FIG. 9. In a possible embodiment, a recurrent neural network data model RNN can be trained in step 904 based on the supplied training data set to recognize the trajectory pattern described by the training data. The resulting artificial intelligence model AIM can be stored in step 905 in a memory for later use. The artificial intelligence model AIM resulting from the training process illustrated in FIG. 9 can be used to verify whether the satellite signal source observations SSSO received from an antenna A do match an expected satellite signal source trajectory SSST modeled by the trained recurrent neural network RNN.

Figure 10:
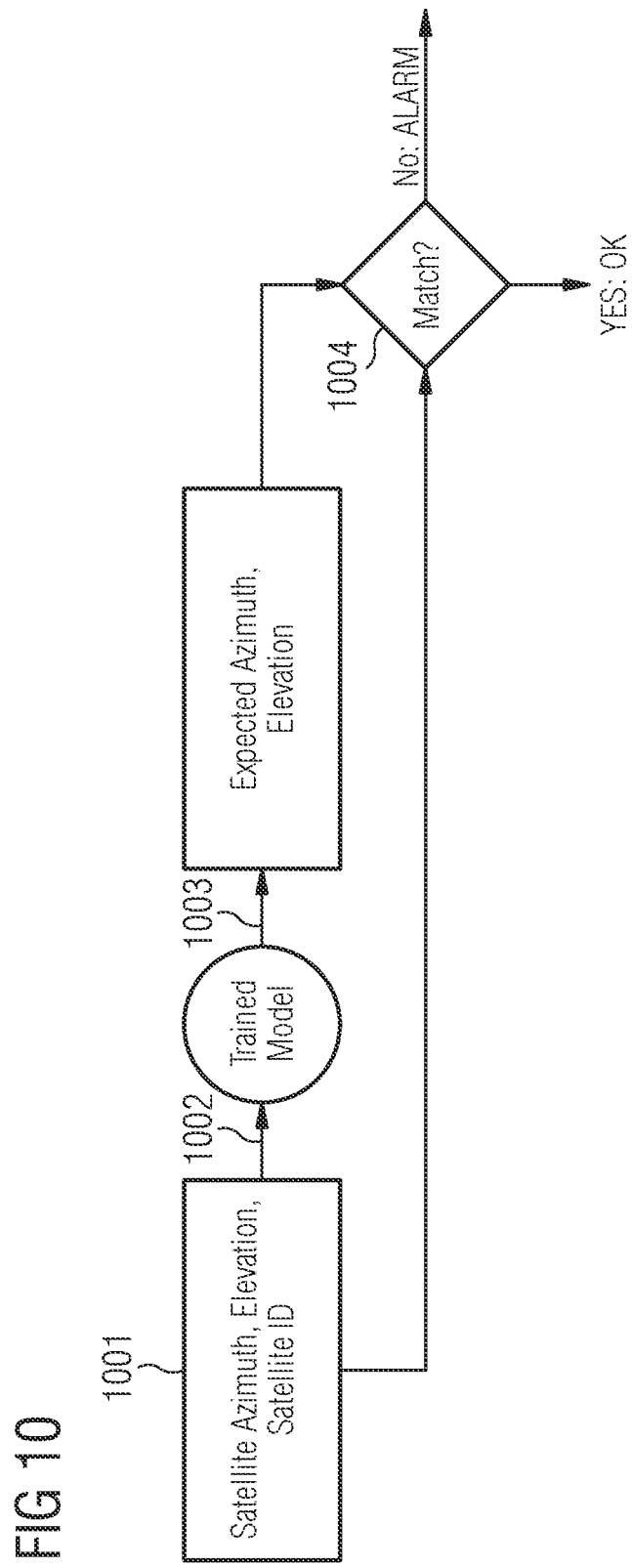
FIG. 10 shows a further schematic diagram for illustrating the operation of a possible exemplary embodiment of a method and corresponding apparatus for automatic detection of antenna site conditions according to the present invention.

To verify that the observed satellite locations are true and accurate, each new observed satellite position provided by the antenna A in step 1001 can be fed in step 1002 to the trained recurrent neural network model RNN. Over a short time, the trained recurrent neural network RNN can have enough data to fit the live observed data at its location in the modeled trajectory. At this point, the model is capable of computing in step 1003 the next expected location for each new time step which can be compared in step 1004 to check whether the satellite location matches the expected trajectory or not. In case that the observed satellite location does not match the expected trajectory, it is possible that the location has been spoofed. This may trigger a spoofing alarm as also illustrated in FIG. 10.

The invention further provides according to a further aspect a method and apparatus for detection of jamming. In a possible embodiment, a training set of obstruction vectors V labeled as normal or jammed are supplied to an artificial intelligence, AI, model implemented as a deep neural network with hidden layers as training data used to train the artificial intelligence, AI, model to recognize a normal reception versus a jammed reception. The trained artificial intelligence, AI, model can then be stored as a jamming model in a memory.

The satellite signal source observations SSSO of an antenna A can be transformed into a two-dimensional, 2D, grey-scale image fed to a trained convolutional neural network CNN to calculate an obstruction vector V supplied to the trained artificial intelligence, AI, jamming model to calculate as an output whether the respective signal reception is normal or jammed.

Figure 11:
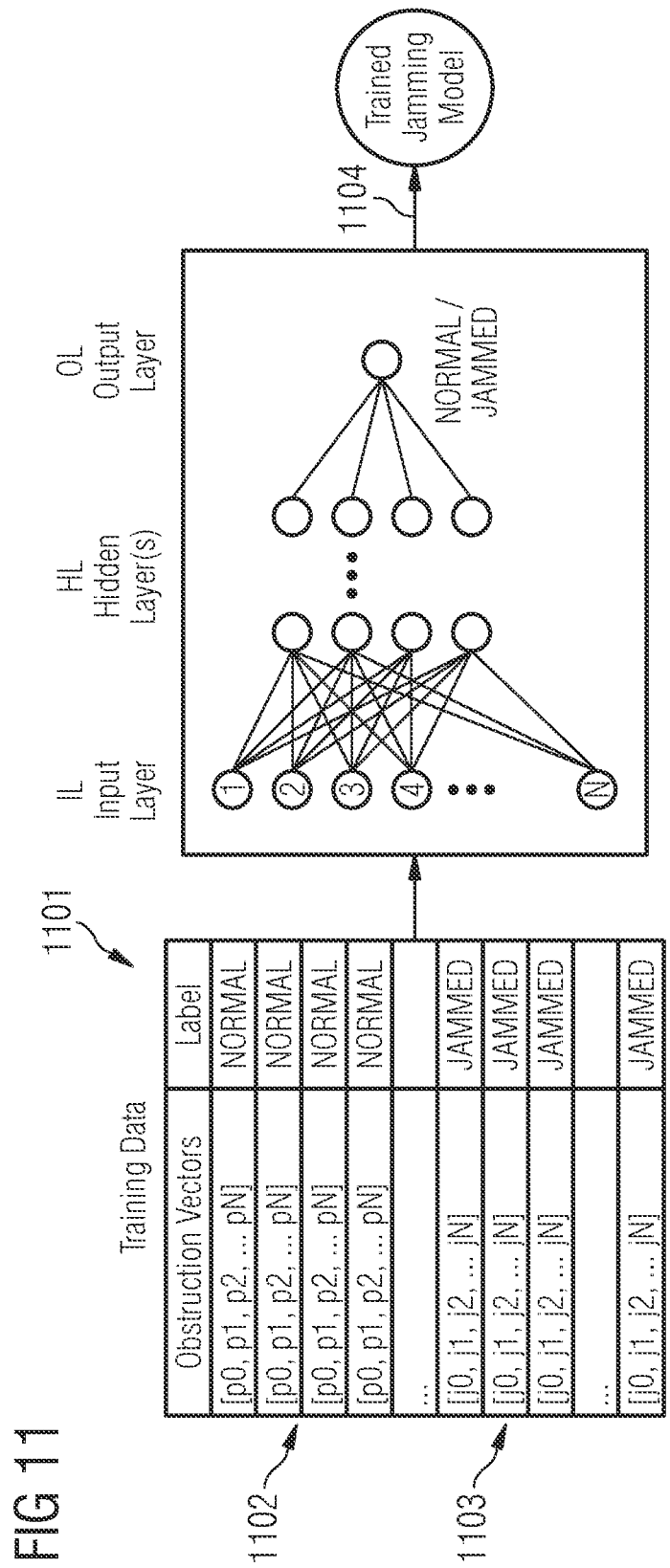
FIG. 11 shows a further schematic diagram for illustrating a possible exemplary embodiment of a method and corresponding apparatus for automatic detection of antenna site conditions accord ing to the present invention.

As the output of a GNSS artificial intelligence, AI, model serves as a kind of "fingerprint" for each antenna site AS, it is possible to detect GNSS jamming intrusions comparing the model output from a normal antenna site AS to that of an antenna site AS which has jamming noise added. A secondary artificial intelligence can therefore be trained to recognize and/or classify normal reception versus jammed reception fingerprints. As illustrated in FIG. 11, a training data set can be constructed in step 1111 from a set of obstruction vectors V labeled as normal in step 1102 and a set of obstruction vectors V representing jammed sites and labeled as jammed in step 1103. Each entry in the training data set is either labeled as "normal" or "jammed" as illustrated in FIG. 11. The labeled training data set is then used to train a neural network NN to recognize the difference between the two classes of data. Such a neural network NN can comprise a multilayer perceptron (MLP) architecture with M input nodes of an input layer IL wherein M corresponds to the size of the obstruction vector V, one or more intermediate or hidden layers HL and an output node of an output layer OL providing a binary classification of the received data. A sufficient amount of input data of the trained jamming model results from the training process illustrated in FIG. 11. The trained jamming data model can be stored in step 1104 and used to determine whether the input GNSS data received from an antenna A does represent a valid/normal situation or if the antenna site AS has been jammed.

Figure 12:
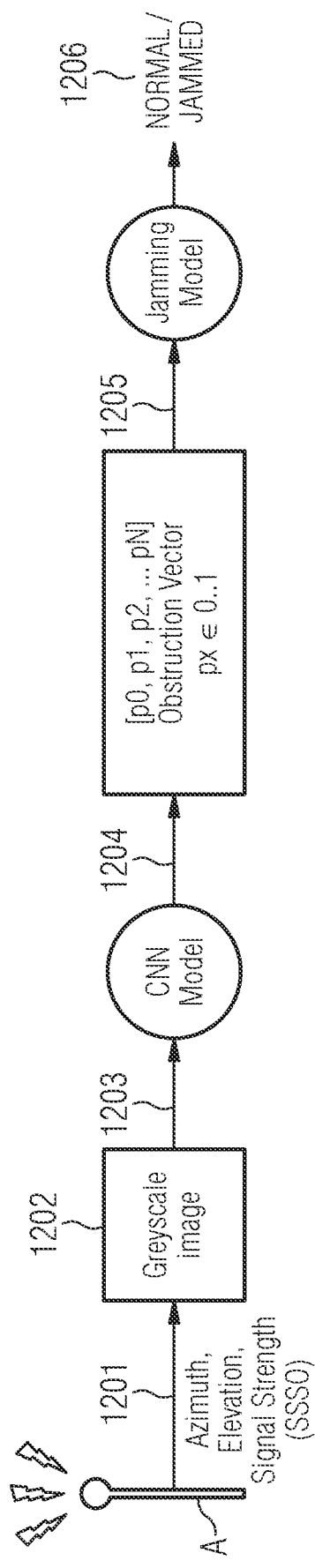
FIG. 12 shows a further schematic diagram for illustrating a possible exemplary embodiment of a method and corresponding apparatus for automatic detection of antenna site conditions according to the present invention.

The process of detecting jamming is illustrated in FIG. 12. As can be seen in FIG. 12, antenna data supplied in step 1201 from an antenna A comprising an azimuth angle, an elevation angle and signal strength is converted in step 1202 into a grey-scale image supplied in step 1203 of a convolutional neural network CNN model to generate in step 1204 obstruction vectors V. The obstruction vectors V are supplied to the trained jamming data model in step 1205 to provide in step 1206 as an output whether the antenna site AS of the antenna A has been jammed or not. The number of satellite observations SSSO are collected and converted into the grey-scale image supplied to the CNN data model in step 1203 to provide as an out put an obstruction vector V. The obstruction vector V is fed in step 1205 as an input to the trained jamming model provided by the training process illustrated in FIG. 11 which returns as a result in step 1206 whether the antenna site AS has been jammed or not.

Figure 13:
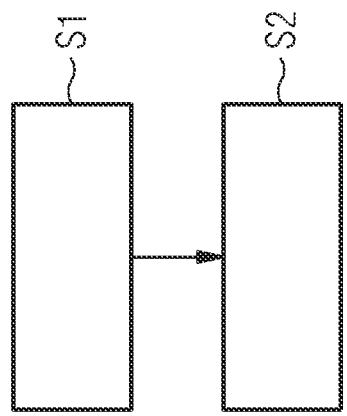
FIG. 13 shows a flowchart for illustrating a possible embodiment of a method for automatic detection of antenna site conditions according to the present invention.

FIG. 13 shows a flowchart for a possible embodiment of a method for automatic detection of antenna site conditions ASC at an antenna site AS of an antenna comprising two main steps.

In a first step S1, signal source observations SSO which have been derived from signals received by the antenna A from at least one signal source are provided.

In a further step S2, the signal source observations SSO are transformed into images fed to a trained image-processing artificial intelligence, AI, model which calculates automatically antenna site conditions ASC at the antenna site AS of the respective antenna A.

The used artificial intelligence, AI, model can be implemented as a neural network NN, in particular as a convolutional neural network CNN. A signal source comprising the signal source observations SSO comprise in a possible embodiment a satellite signal source SSS transmitting satellite signals received by the antenna A to derive satellite signal source observations SSSO of the antenna A with respect to the satellite signal source SSS.

Each satellite signal source observation SSSO derived in step S1 can comprise an azimuth angle of the satellite signal source SSS in relation to the antenna A, an elevation angle of the satellite signal source SSS in relation to the antenna A and a signal strength of the satellite signal received by the antenna A from the satellite signal source SSS.

Figure 14:
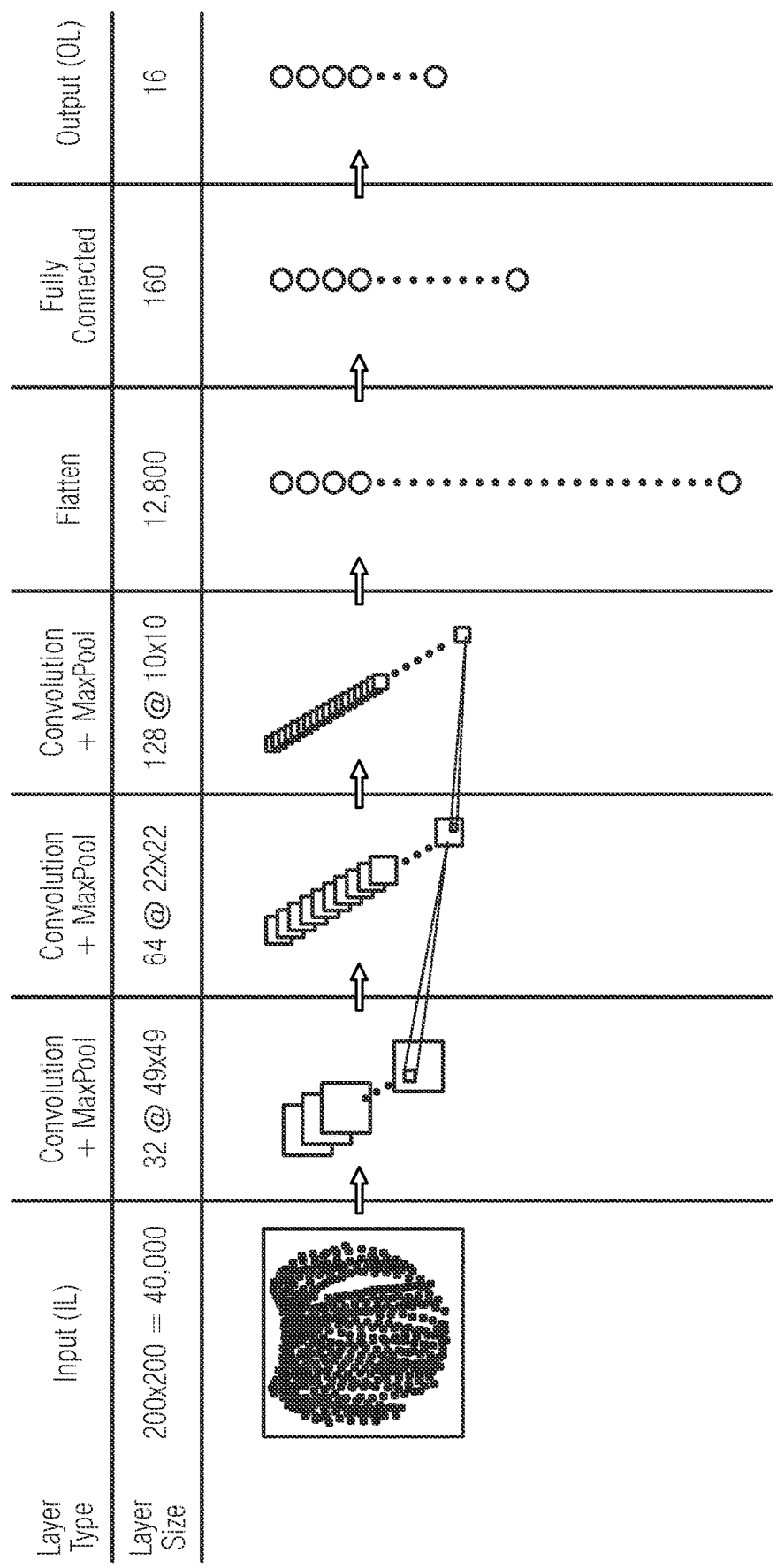
FIG. 14 shows an exemplary implementation of a convolutional neural network used in a possible embod iment of a method and corresponding apparatus for automatic detection of antenna site conditions.

FIG. 14 shows an exemplary convolutional neural network CNN architecture which can be used by the method and corresponding apparatus for automatic detection of antenna site conditions ASC at an antenna site AS of an antenna. The convolutional neural network CNN illustrated in FIG. 14 can be used to process blind spots. The illustrated architecture of FIG. 14 is only exemplary and the parameters can differ depending on the use case.

In the illustrated specific example of FIG. 14, the in put layer of the convolutional neural network CNN comprises a two-dimensional grey-scale image with 200×200 pixels. The input image comprises one channel which encodes the signal strength. Accordingly, the input data dimension is 200×200×1.

The input image is passed to a series of convolutional and max-pool processing steps to extract and build feature maps. Each step encodes image subpatterns at increasingly higher levels. The frontend layers decompose the input image into granular feature maps which are then flattened and passed to a number of neural network layers. In the illustrated specific example, the output layer OL comprises 16 output nodes each of which does encode a blind spot probability for each of the 16 sectors of the input image. All nodes can use in a possible embodiment a rectified linear unit (ReLU) activation function except for the output layer OL which uses in a preferred embodiment a sigmoid output function to calculate probabilities for each image sector independently. The model is compiled with a binary cross entropy loss function which allows to compute independent output probabilities for each of the 16 output nodes of the output layer OL. Other neural network architectures can be used in alternative embodiments. The particular convolutional neural network CNN illustrated in FIG. 14 is provided as a specific example of an architecture that can operate for GNSS blind spot detection.

In a possible embodiment of the method illustrated in FIG. 13, a sky position (azimuth and elevation) and a signal strength (dBHz) for each satellite signal source SSS visible to a GNSS antenna A can be periodically logged to build up a historical view of satellite reception conditions of different parts of the observed sky.

This data is transformed automatically from horizontal coordinates (azimuth, elevation) in a two-dimensional image which is then fed to an image-processing artificial intelligence, AI, model trained to detect automatically antenna site obstructions or blind spots. This provides a method for reliable automatic long-term satellite reception signal quality estimates at large scale.

An advantage of the automatic detection method according to the present invention is that it allows to produce a detailed and reliable assessment of antenna site conditions ASC without the need of large amounts of tedious manual labor. Further, the evaluation of a single antenna site AS based on the available data is time-consuming and error-prone. Telecommunication networks can comprise more than 1,000 GNSS antennas A deployed across a large geographical area. Accordingly, manual surveys are not only impractical but they may be even unfeasible. With the method according to the present invention, the used trained image-processing artificial intelligence, AI, model can perform such surveys continuously without any human intervention and can detect automatically changes in antenna site conditions ASC occurring over the passage of time. A further advantage of the method according to the present invention is that it can use data that is already collected by antennas A and does not require any additional measurement equipment. The method according to the present invention implements an artificial intelligence, AI, processing pipeline which takes as input a set of signal source observations SSO and produces antenna site conditions ASC at an antenna site AS of the respective antenna A on the basis of calculated signal obstruction vectors V.

The method and corresponding apparatus for automatic detection of antenna site conditions ASC can be used for different kinds of antennas, in particular for satellite antennas. The embodiments explained above can be combined with each other.

The invention claimed is:

1. A method for automatic detection of antenna site conditions, ASC, at an antenna site, AS, of an antenna, A, the method comprising the steps of:
   (a) providing signal source observations, SSO, derived from signals received, at one instant of time, by the antenna, A, from at least one signal source, SS, and
   (b) transforming the signal source observations, SSO, into images fed to a trained image-processing artificial intelligence, AI, model which calculates antenna site conditions, ASC, at an antenna site, AS, of the respective antenna, A,
   wherein the trained artificial intelligence, AI, model calculates an obstruction vector, V, comprising a predetermined number, N, of probability values, p, for N antenna sectors around the antenna site, AS, of the respective antenna, each of the probability values, p, indicating a probability that at the instant of time an obstruction of the antenna, A, exists in an associated antenna sector of the N antenna sectors around the antenna site, AS, of the respective antenna.

2. The method according to claim 1, wherein the artificial intelligence, AI, model is implemented as a neural network, NN, in particular as a convolutional neural network, CNN.

3. The method according to claim 2, wherein an expected satellite signal source trajectory, SSST, is calculated for each satellite signal source, SSS, observed at the antenna site, AS, of the antenna, A.

4. The method according to claim 3, wherein the satellite signal source trajectory, SSST, is calculated from a starting configuration comprising a start time, a satellite identifier identifying the respective satellite signal source, SSS, and a geolocation of the observed antenna site, AS, of the respective antenna, A.

5. The method according to claim 4, wherein the calculated expected satellite signal source trajectory, SSST, comprises a set of expected satellite positions at different time steps relative to an observer antenna site, AS, of the antenna, A, including an azimuth angle and an elevation angle relative to the observer antenna site at each time step.

6. The method according to claim 5, wherein the calculated set of expected satellite positions with associated time steps are supplied to a recurrent neural network, RNN, as training data used to train the recurrent neural network, RNN, to recognize a satellite signal source trajectory, SSST, described by the training data, wherein the trained recurrent neural network, RNN, is stored in a memory.

7. The method according to claim 6, wherein satellite signal source observations, SSSO, of the antenna, A, are fed to the trained recurrent neural network, RNN, to verify whether the satellite signal source observations, SSSO, do match with an expected satellite signal source trajectory, SSST, modelled by the trained recurrent neural network, RNN.

8. The method according to claim 7, wherein if the satellite signal source observations, SSSO, do not match the expected satellite signal source trajectory, SSST, an alarm is triggered indicating a possible spoofing of the satellite signal source, SSS, location.

9. The method according to claim 2, wherein a training set of obstruction vectors, V, labeled as normal or jammed are supplied to an artificial intelligence, AI, model implemented as a deep neural network with hidden layers as training data used to train said artificial intelligence, AI, model to recognize a normal reception versus a jammed reception, wherein the trained artificial intelligence, AI, model is stored as a jamming model in a memory.

10. The method according to claim 9, wherein satellite signal source observations, SSSO, are transformed into a two-dimensional, 2D, grey-scale image fed to a trained convolutional neural network, CNN, to calculate an obstruction vector, V, supplied to the trained artificial intelligence, AI, jamming model calculating as an output whether the signal reception is normal or jammed.

11. The method according to claim 1, wherein the signal source, SS, comprises a satellite signal source, SSS, transmitting satellite signals received by the antenna, A, to derive satellite signal source observations, SSSO, of the antenna, A, with respect to the satellite signal source, SSS.

12. The method according to claim 11, wherein each satellite signal source observation, SSSO, comprises an azimuth angle of the satellite signal source, SSS, in relation to the antenna, A, an elevation angle of the satellite signal source, SSS, in relation to the antenna, A, and a signal strength of the satellite signal received by the antenna, A, from the satellite signal source, SSO.

13. The method according to claim 12, wherein the satellite signal source observations, SSSO, are transformed into a two-dimensional, 2D, grey-scale image fed to the trained image-processing artificial intelligence, AI, model wherein the pixels of said grey-scale image have pixel intensities based on the signal strength of the received satellite signals.

14. The method according to claim 13, wherein the azimuth angle of the satellite signal source, SSS, in relation to the antenna, A, and the elevation angle of the satellite signal source, SSS, in relation to the antenna, A, form three-dimensional, 3D, horizontal coordinates of the satellite signal source, SSS, which are transformed into corresponding two-dimensional, 2D, Cartesian coordinates of the satellite signal source, SSS.

15. The method according to claim 14, wherein the two-dimensional, 2D, Cartesian coordinates are transformed into a two-dimensional array of image pixels having pixel intensity values computed from the signal strength of the signal received from the satellite signal source, SSS, at the respective coordinates and normalized to provide the two-dimensional, 2D, grey-scale image fed to the trained image-processing artificial intelligence, AI, model.

16. The method according to claim 1, wherein the obstruction vectors, V, calculated for the antenna site, AS, of the respective antenna, A, are timestamped and stored in an obstruction vector database, V-DB.

17. The method according to claim 16, wherein the calculated obstruction vectors, V, of an antenna, A, are processed to detect changes in the obstruction vectors, V, reflecting changes of the antenna site conditions, ASC, at the antenna site, AS, of the respective antenna, A.

18. The method according to claim 1, wherein a registered sequence of obstruction vectors, V, calculated for an antenna, A, are fed to a further artificial intelligence, AI, model implemented as a neural network, NN, in particular a recurrent neural network, RNN, to detect changes of the antenna site conditions, ASC, at the antenna site AS, of the respective antenna, A.

19. The method according to claim 18, wherein an alert is automatically generated if changes in the antenna site conditions, ASC, at the antenna site, AS, of the respective antenna, A, are detected.

20. The method according to claim 1, wherein the image-processing artificial intelligence, AI, model is trained on the basis of a plurality of two-dimensional, 2D, grey-scale images divided into a predetermined number of labeled image sectors around the antenna site, AS, of the antenna, A.

21. An antenna site condition, ASC, detection apparatus for automatic detection of antenna site conditions, ASC, at an antenna site, AS, of at least one antenna, A, said apparatus comprising:

a processor adapted to process signal source observations, SSO, derived from a signal received, at one instant of time, by the antenna, A, from a signal source, SS, to transform the signal source observations, SSO, into images fed to a trained image-processing artificial intelligence, AI, model which calculates antenna site conditions, ASC, at the antenna site, AS, of the respective antenna, A, wherein the trained artificial intelligence, AI, model is adapted to calculate an obstruction vector, V, comprising a predetermined number, N, of probability values, p, for N antenna sectors around the antenna site, AS, of the respective antenna, each of the probability values, p, indicating a probability that at the instant of time an obstruction of the antenna, A, exists at an associated antenna sector of the N antenna sectors around the antenna site, AS, of the respective antenna, A.

22. The apparatus according to claim 21 wherein the signal source observations, SSO, comprise satellite signal source observations, SSSO, including an azimuth angle of the satellite signal source, SSS, in relation to the antenna, A, an elevation angle of the satellite signal source, SSS, in relation to the antenna, A, and a signal strength of the satellite signal received by the antenna, A, from the satellite signal source, SSS.

23. The apparatus according to claim 22, wherein the processor is adapted to transform the satellite signal source observations, SSSO, into a two-dimensional, 2D, grey-scale image fed to the trained image-processing artificial intelligence, AI, model, wherein the pixels of said grey-scale image have pixel intensity values based on the signal strength of the received satellite signals.

24. The apparatus according to claim 23, wherein the processor is adapted to transform the azimuth angle of the satellite signal source, SSS, relative to the antenna, A, and the elevation angle of the satellite signal source, SSS, relative to the antenna, A, forming three-dimensional, 3D, horizontal coordinates of the satellite signal source, SSS, into corresponding two-dimensional, 2D, Cartesian coordinates of the satellite signal source, SSS, and to transform the two-dimensional, 2D. Cartesian coordinates into a two-dimensional array of image pixels having pixel intensity values computed from the signal strength of the received satellite signal source, SSS, at the respective coordinates and normalized to provide the two-dimensional, 2D, grey-scale image fed to the trained image-processing artificial intelligence, AI, model.

25. The apparatus according to claim 21, wherein the calculated obstruction vectors, V, for the antenna site, AS, of the respective antenna, A, are timestamped and stored in an obstruction vector database, V-DB.

26. The apparatus according to claim 21, wherein the calculated obstruction vectors, V, of an antenna, A, are processed by the processor to detect changes in the obstruction vectors, V, reflecting changes of the antenna site conditions, ASC, at the antenna site, AS, of the respective antenna, A, wherein a registered sequence of obstruction vectors, V, calculated for an antenna, A, are fed into a further artificial intelligence, AI, model implemented as a neural network, NN, in particular a recurrent neural network, RNN, to detect changes of the antenna site conditions, ASC, at the antenna site, AS, of the respective antenna, A.

27. The apparatus according to claim 21, wherein the image-processing artificial intelligence, AI, model implemented in particular by a convolutional neural network, CNN, is trained on the basis of a plurality of two-dimensional, 2D, grey-scale images divided into a predetermined number of labeled image sectors around the antenna site, AS, of the antenna, A.

28. The apparatus according to claim 21, wherein the apparatus is adapted to automatically generate an alert if changes in the antenna site conditions, ASC, at the antenna site, AS, of the respective antenna, A, are detected.

29. The apparatus according to claim 22, wherein the satellite signal source observations, SSSO, are supplied to a trained recurrent neural network, RNN, of said apparatus to verify whether the satellite signal source observations, SSSO, match with an expected satellite signal source trajectory, SSST.

30. The apparatus according to claim 22, wherein the satellite signal source observations, SSSO, are transformed into a two-dimensional, 2D, grey-scale image fed to a trained convolutional neural network, CNN, of said apparatus to calculate an obstruction vector, V, supplied to a trained artificial intelligence, AI, jamming model calculating as an output whether the signal reception is normal or jammed.

* * * * *